United States Patent [19]
Tancrede

[11] Patent Number: 5,890,456
[45] Date of Patent: Apr. 6, 1999

[54] RETRACTABLE ANIMAL LEASH DEVICE

[76] Inventor: Bruce D. Tancrede, 45 A Stone Trail, North Providence, R.I. 02904

[21] Appl. No.: 97,963

[22] Filed: Jun. 16, 1998

[51] Int. Cl.$^6$ .................................................. A01K 27/00
[52] U.S. Cl. .............................................................. 119/794
[58] Field of Search ................................. 119/792, 794, 119/795, 796, 797, 850, 855; 242/379, 398, 400

[56] References Cited

U.S. PATENT DOCUMENTS

| | | | |
|---|---|---|---|
| 3,233,591 | 2/1966 | Rogers et al. | 119/796 |
| 3,315,642 | 4/1967 | Rogers et al. | 119/796 |
| 4,328,766 | 5/1982 | Deibert | 119/796 |
| 5,762,029 | 6/1998 | Dubois et al. | 119/796 |

Primary Examiner—Thomas Price

[57] ABSTRACT

A new retractable animal leash device for holding and storing animal waste bags therein. The inventive device includes a housing having a spaced apart pair of side panels and a circumferential wall extending between the side panels. A handle is coupled the housing. The housing has an opening into the interior of the housing. A retractable elongate flexible leash is provided in the interior of the housing. The leash has a free end for attachment to an animal extending through the opening of the housing. Each of the side panels has a storage compartment in the interior of the housing.

12 Claims, 2 Drawing Sheets

5,890,456

RETRACTABLE ANIMAL LEASH DEVICE

BACKGROUND OF THE INVENTION

1. Field of the Invention

The present invention relates to retractable animal leashes and more particularly pertains to a new retractable animal leash device for holding and storing animal waste bags therein.

2. Description of the Prior Art

The use of retractable animal leashes is known in the prior art. More specifically, retractable animal leashes heretofore devised and utilized are known to consist basically of familiar, expected and obvious structural configurations, notwithstanding the myriad of designs encompassed by the crowded prior art which have been developed for the fulfillment of countless objectives and requirements.

Known prior art retractable animal leashes include U.S. Pat. No. 4,146,260; U.S. Pat. No. 5,540,469; U.S. Pat. No. Des. 274,379; U.S. Pat. No. 5,174,620; U.S. Pat. No. 4,165,713; and U.S. Pat. No. 3,286,826.

While these devices fulfill their respective, particular objectives and requirements, the aforementioned patents do not disclose a new retractable animal leash device. The inventive device includes a housing having a spaced apart pair of side panels and a circumferential wall extending between the side panels. A handle is coupled the housing. The housing has an opening into the interior of the housing. A retractable elongate flexible leash is provided in the interior of the housing. The leash has a free end for attachment to an animal extending through the opening of the housing. Each of the side panels has a storage compartment in the interior of the housing.

In these respects, the retractable animal leash device according to the present invention substantially departs from the conventional concepts and designs of the prior art, and in so doing provides an apparatus primarily developed for the purpose of holding and storing animal waste bags therein.

SUMMARY OF THE INVENTION

In view of the foregoing disadvantages inherent in the known types of retractable animal leashes now present in the prior art, the present invention provides a new retractable animal leash device construction wherein the same can be utilized for holding and storing animal waste bags therein.

The general purpose of the present invention, which will be described subsequently in greater detail, is to provide a new retractable animal leash device apparatus and method which has many of the advantages of the retractable animal leashes mentioned heretofore and many novel features that result in a new retractable animal leash device which is not anticipated, rendered obvious, suggested, or even implied by any of the prior art retractable animal leashes, either alone or in any combination thereof.

To attain this, the present invention generally comprises a housing having a spaced apart pair of side panels and a circumferential wall extending between the side panels. A handle is coupled the housing. The housing has an opening into the interior of the housing. A retractable elongate flexible leash is provided in the interior of the housing. The leash has a free end for attachment to an animal extending through the opening of the housing. Each of the side panels has a storage compartment in the interior of the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new retractable animal leash device apparatus and method which has many of the advantages of the retractable animal leashes mentioned heretofore and many novel features that result in a new retractable animal leash device which is not anticipated, rendered obvious, suggested, or even implied by any of the prior art retractable animal leashes, either alone or in any combination thereof.

It is another object of the present invention to provide a new retractable animal leash device which may be easily and efficiently manufactured and marketed.

It is a further object of the present invention to provide a new retractable animal leash device which is of a durable and reliable construction.

An even further object of the present invention is to provide a new retractable animal leash device which is susceptible of a low cost of manufacture with regard to both materials and labor, and which accordingly is then susceptible of low prices of sale to the consuming public, thereby making such retractable animal leash device economically available to the buying public.

Still yet another object of the present invention is to provide a new retractable animal leash device which provides in the apparatuses and methods of the prior art some of the advantages thereof, while simultaneously overcoming some of the disadvantages normally associated therewith.

Still another object of the present invention is to provide a new retractable animal leash device for holding and storing animal waste bags therein.

Yet another object of the present invention is to provide a new retractable animal leash device which includes a housing having a spaced apart pair of side panels and a circumferential wall extending between the side panels. A handle is coupled the housing. The housing has an opening into the interior of the housing. A retractable elongate flexible leash is provided in the interior of the housing. The leash has a free end for attachment to an animal extending through the opening of the housing. Each of the side panels has a storage compartment in the interior of the housing.

Still yet another object of the present invention is to provide a new retractable animal leash device that has two separate storage compartments: one for holding a quantity of resealable plastic bags and another for holding plastic bags filled with animal waste therein.

Even still another object of the present invention is to provide a new retractable animal leash device that provides a user with a convenient and out of sight location for carrying bags containing animal stools therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
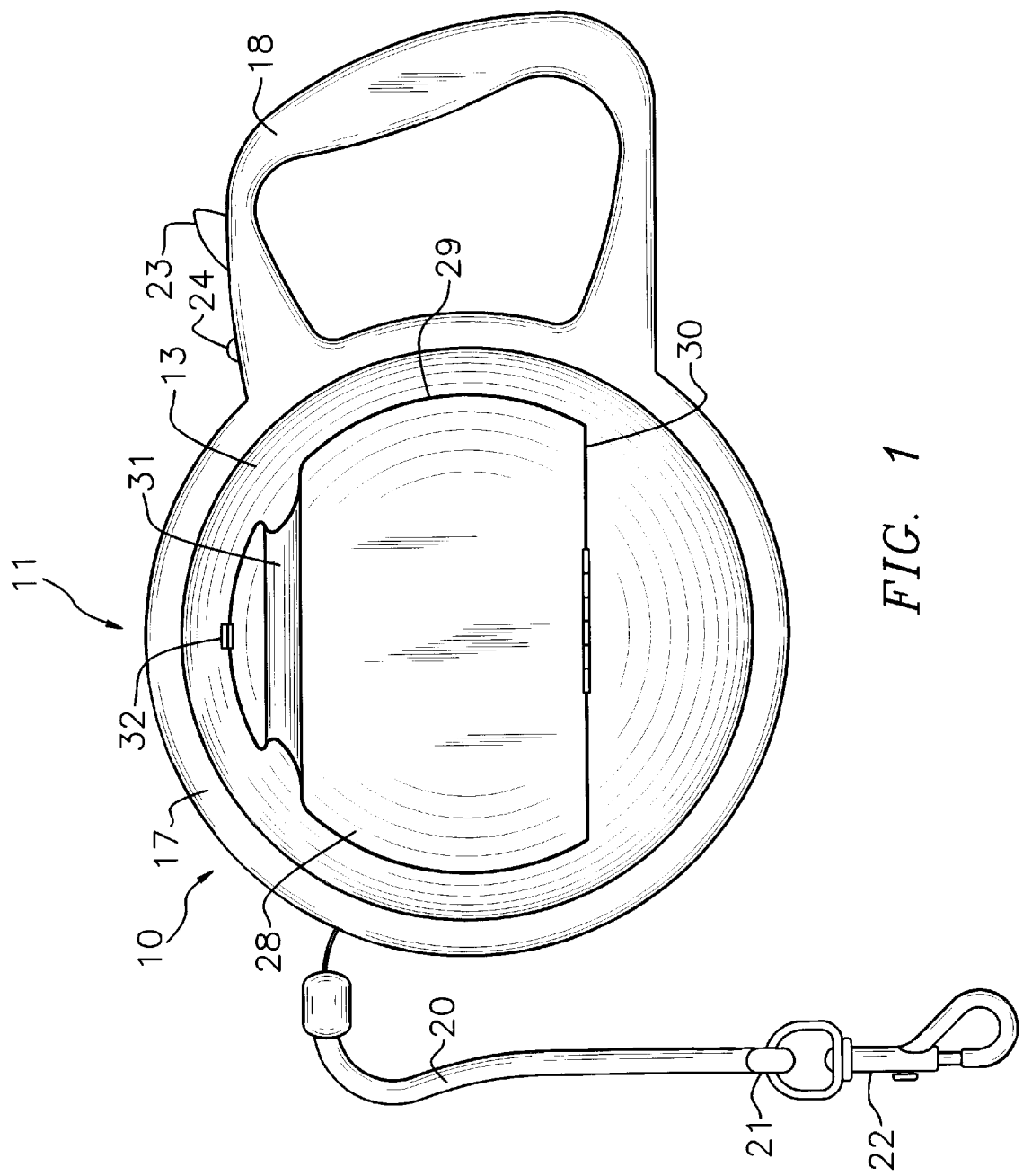
FIG. 1 is a schematic side view of a new retractable animal leash device according to the present invention.
Figure 2:
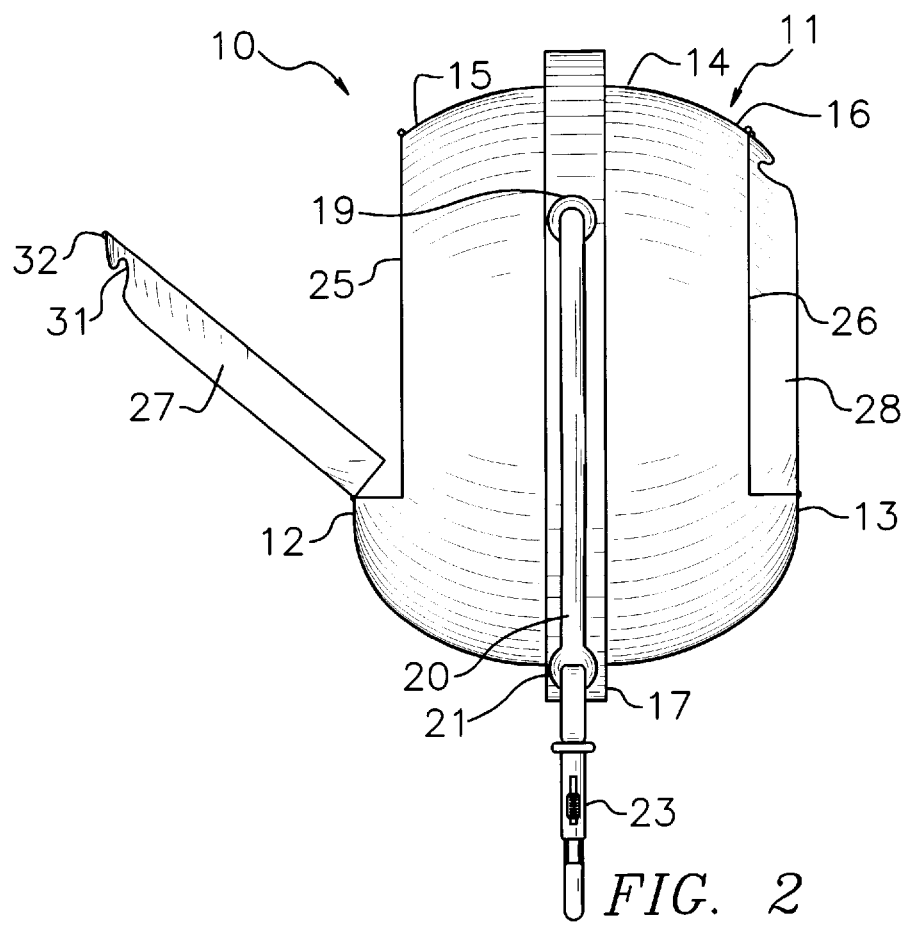
FIG. 2 is another schematic side view of the present invention.
Figure 3:
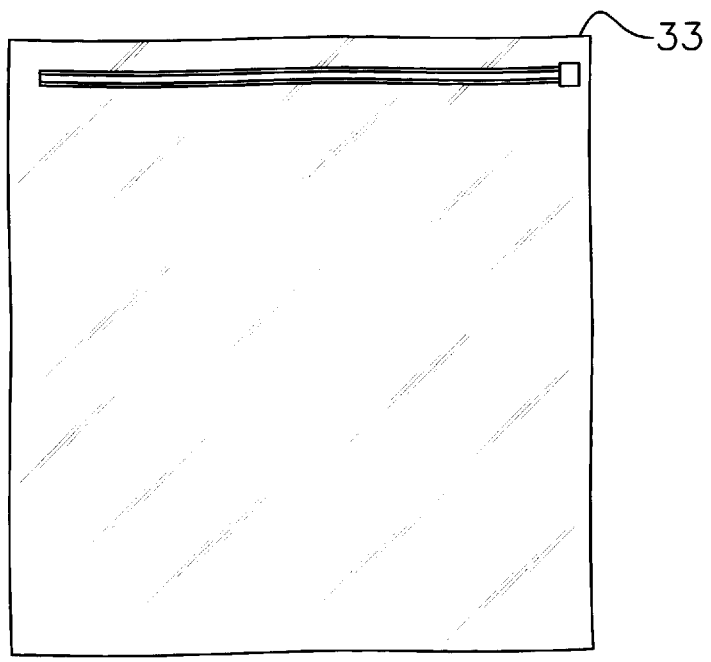
FIG. 3 is a schematic side view of a plastic bag of the present invention.

With reference now to the drawings, and in particular to FIGS. 1 through 3 thereof, a new retractable animal leash device embodying the principles and concepts of the present invention and generally designated by the reference numeral 10 will be described.

As best illustrated in FIGS. 1 through 3, the retractable animal leash device 10 generally comprises a housing 11 having a spaced apart pair of side panels 12,13 and a circumferential wall 14 extending between the side panels 12,13. A handle 18 is coupled the housing 11. The housing 11 has an opening 19 into the interior of the housing 11. A retractable elongate flexible leash 20 is provided in the interior of the housing 11. The leash 20 has a free end 21 for attachment to an animal extending through the opening 19 of the housing 11. Each of the side panels 12,13 has a storage compartment 25,26 in the interior of the housing 11.

In closer detail, the housing 11 has an interior, a spaced apart pair of generally circular side panels 12,13 and a circumferential wall 14 extending between the side panels 12,13 around the perimeters of the side panels 12,13. The housing 11 has a diameter extending across the circumferential wall 14 and an axis extending through the side panels 12,13. The side panels 12,13 are coaxial with the axis of the housing 11. The housing 11 is preferably generally spheroid in shape such that the side panels 12,13 are flat and the circumferential wall 14 has an arcuate portion 15,16 adjacent each of the side panels 12,13.

The circumferential wall 14 has an equatorial annular ridge 17 extending radially outwards therearound at a midpoint between the side panels 12,13. The ridge 17 preferably has a generally rectangular cross section taken generally perpendicular to the diameter of the housing 11. The ridge 17 lies in a plane generally perpendicular to the axis of the housing 11. A handle 18 is coupled to the ridge 17. The handle 18 is extended in a direction generally parallel to the plane of the ridge 17.

The housing 11 has a width defined between the side panels 12,13. Preferably, the width of the housing 11 is greater than about 2 inches. Ideally, the width of the housing 11 is about 4 inches. The ridge 17 has a diameter collinear with the diameter of the housing 11. Preferably, the diameter of the ridge 17 is greater than about 3½ inches. Ideally, the diameter of the ridge 17 is about 7 inches.

The housing 11 has an opening 19 into the interior of the housing 11. The opening 19 is positioned on the ridge 17. A spring loaded retractable elongate flexible leash 20 is provided in the interior of the housing 11. The leash 20 has a free end 21 for attachment to the collar of an animal extending through the opening 19 of the housing 11. The free end 21 of the leash 20 preferably has a fastener 22 such as a spring bolt clip for releasable attachment to the collar of an animal swivelably coupled thereto. A leash brake actuator 23 and a brake lock actuator 24 are provided on the handle 18. The actuators are operationally connected to the retractable leash 20 to halt further extension of the leash 20 from the housing 11.

Each of the side panels 12,13 has a storage compartment 25,26 in the interior of the housing 11. Each of the side panels 12,13 has a compartment door 27,28 substantially closing the storage compartment 25,26. Preferably, the compartment door 27,28 of each of the side panels 12,13 has an arcuate edge portion 29 and a straight edge portion 30. The straight edge portion 30 of the compartment door is pivotally coupled by a hinge to the associated side panel. The arcuate edge portion 29 of each of the compartment doors defines an arc has an arc angle greater than about 180 degrees such that the arcuate edge portion 29 extends along an arc greater than the arc of a semi-circle but less than the circumference of the complete circle. Each of the compartment doors has an elongate handle depression 31 that extends into the interior of the housing 11 when the compartment door is closed. The handle depression 31 is spaced apart from the straight edge portion 30 of the compartment door 27,28 with the length of the handle depression extending generally parallel to the length of the straight edge portion 30 of the compartment door 27,28. Each of the compartment doors also has a latch 32 for releasably holding the compartment door to the associated side panel of the housing 11. The latch 32 is positioned on the arcuate edge portion 29 of the compartment door such that the handle depression 31 is positioned between the latch 32 and the straight edge portion 30 of the compartment door. Ideally, each of the compartment doors has a maximum width of about 2¾ inches and a length between the latch 32 and the straight edge portion 30 of about 3¾ inches.

In use, one of the storage compartments is designed for storing resealable plastic bags 33 therein. Preferably, the flexible bags 33 are opaque so that the contents, such as animal stools, held in each of the bags 33 cannot be seen through the bag. In use, the other storage compartment is designed for storing filled plastic bags 33 therein until the user can dispose of the filled bags 33.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A retractable animal leash device, comprising:
    a housing having an interior, a spaced apart pair of side panels and a circumferential wall extending between said side panels;
    a handle being coupled to said housing;
    said housing having an opening into said interior of said housing;
    a retractable elongate flexible leash being provided in said interior of said housing, said leash having a free end for attachment to an animal extending through said opening of said housing; and
    each of said side panels having a storage compartment in said interior of said housing.

2. The retractable animal leash device of claim 1, wherein said housing is generally spheroid in shape such that said side panels are flat and said circumferential wall has an arcuate portion adjacent each of said side panels.

3. The retractable animal leash device of claim 1, wherein said housing having a width defined between said side panels, wherein said width of said housing is greater than about 2 inches.

4. The retractable animal leash device of claim 3, wherein said width of said housing is about 4 inches.

5. The retractable animal leash device of claim 1, wherein said ridge has a diameter greater than about 3½ inches.

6. The retractable animal leash device of claim 5, wherein said diameter of said ridge is about 7 inches.

7. The retractable animal leash device of claim 1, wherein each of said side panels has a compartment door substantially closing said storage compartment.

8. The retractable animal leash device of claim 7, wherein said compartment door of each of said side panels has an arcuate edge portion and a straight edge portion, said straight edge portion of said compartment door being pivotally coupled to the associated side panel.

9. The retractable animal leash device of claim 8, wherein said arcuate edge portion of each of said compartment doors defines an arc having an arc angle greater than about 180 degrees.

10. The retractable animal leash device of claim 8, wherein each of said compartment doors has an elongate handle depression, said handle depression being spaced apart from said straight edge portion of said compartment door, said handle depression having a length extending generally parallel to said straight edge portion of said compartment door.

11. The retractable animal leash device of claim 10, wherein each of said compartment doors has a latch for releasably holding said compartment door to the associated side panel of said housing, said latch being positioned on said arcuate edge portion of said compartment door such that said handle depression is positioned between said latch and said straight edge portion of said compartment door.

12. A retractable animal leash device, comprising:
    a housing having an interior, a spaced apart pair of side panels and a circumferential wall extending between said side panels;
    said housing having a diameter extending across said circumferential wall and an axis extending through said side panels, said side panels being coaxial with said axis of said housing;
    said housing being generally spheroid in shape such that said side panels are flat and said circumferential wall has an arcuate portion adjacent each of said side panels;
    said circumferential wall having an equatorial annular ridge extending radially outwards therearound at a midpoint between said side panels, said ridge having a generally rectangular cross section taken generally perpendicular to said diameter of said housing;
    said ridge lying in a plane generally perpendicular to said axis of said housing;
    a handle being coupled to said ridge, said handle being extended in a direction generally parallel to said plane of said ridge;
    said housing having a width defined between said side panels, wherein said width of said housing is about 4 inches;
    wherein said ridge has a diameter collinear with said diameter of said housing, wherein said diameter of said ridge is about 7 inches;
    said housing having an opening into said interior of said housing, said opening being positioned on said ridge;
    a retractable elongate flexible leash being provided in said interior of said housing, said leash having a free end for attachment to an animal extending through said opening of said housing, said free end of said leash having a fastener for attachment to an animal coupled thereto;
    each of said side panels having a storage compartment in said interior of said housing;
    each of said side panels having a compartment door substantially closing said storage compartment, said compartment door of each of said side panels having an arcuate edge portion and a straight edge portion, said straight edge portion of said compartment door being pivotally coupled to the associated side panel;
    said arcuate edge portion of each of said compartment doors defining an arc having an arc angle greater than about 180 degrees;
    each of said compartment doors having an elongate handle depression, said handle depression being spaced apart from said straight edge portion of said compartment door, said handle depression having a length extending generally parallel to said straight edge portion of said compartment door; and
    each of said compartment doors having a latch for releasably holding said compartment door to the associated side panel of said housing, said latch being positioned on said arcuate edge portion of said compartment door such that said handle depression is positioned between said latch and said straight edge portion of said compartment door.

* * * * *